Dec. 2, 1947.     H. D. BROWN     2,431,914
WEAR COMPENSATOR FOR BRAKE BEAM STRUTS
Filed July 31, 1946      2 Sheets-Sheet 1
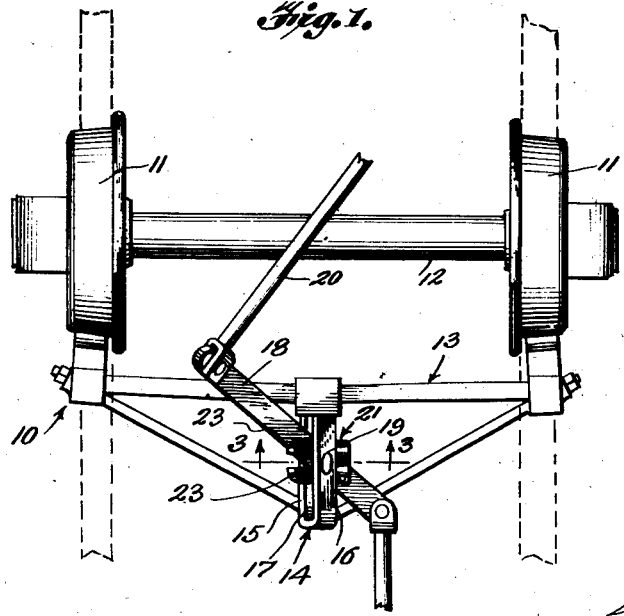
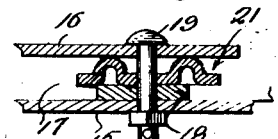
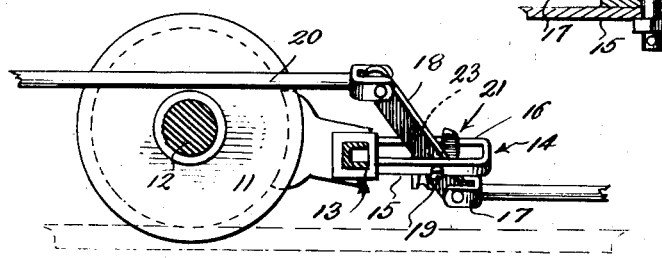
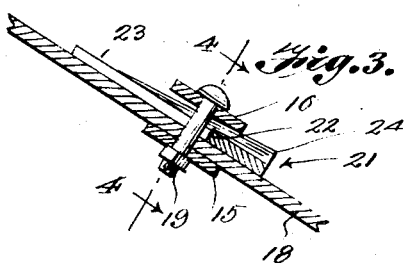
HARRY DALE BROWN Dec. 2, 1947. H. D. BROWN 2,431,914
WEAR COMPENSATOR FOR BRAKE BEAM STRUTS
Filed July 31, 1946 2 Sheets-Sheet 2
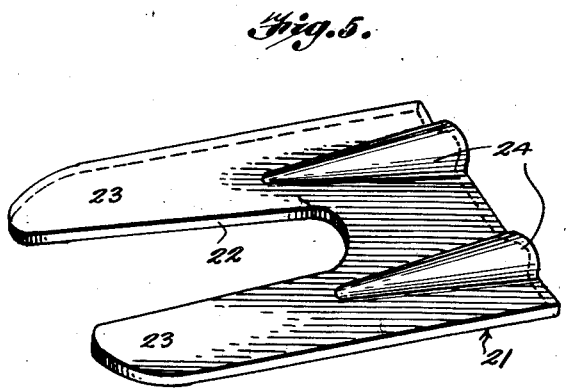
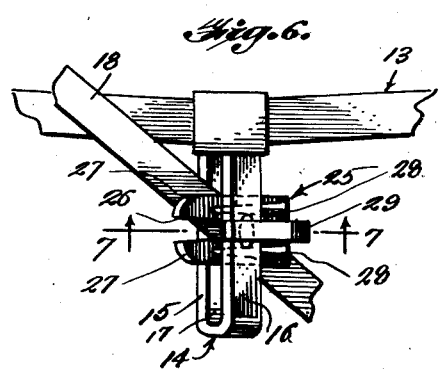
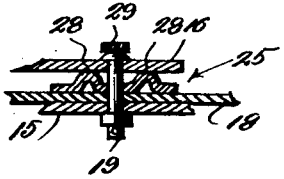
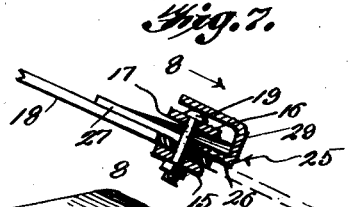
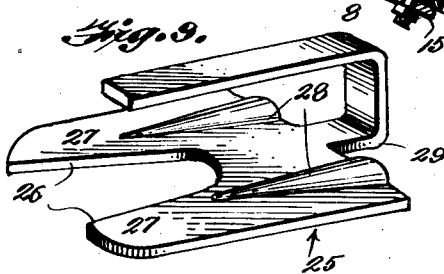
Inventor
HARRY DALE BROWN
By Randolph & Beavers
Attorneys Patented Dec. 2, 1947

2,431,914

UNITED STATES PATENT OFFICE 2,431,914

WEAR COMPENSATOR FOR BRAKE BEAM STRUTS

Harry D. Brown, Danville, Ill.

Application July 31, 1946, Serial No. 687,358

4 Claims. (Cl. 188—231)

This invention relates to a wear compensating device for use with brake levers and brake beam struts of railroad rolling stock for compensating for the wear on levers and struts to maintain the parts connected to the brake lever in proper relationship to the wheel axles of a railway car.

When brake levers and struts of railway equipment become worn, the lever is thereby permitted to become canted to a point where the connecting rod of the brake lever will bear on a wheel axle. This rapidly results in the connecting rod wearing through and resulting in a failure of the brakes.

Accordingly, it is a primary object of the present invention to provide a compensator of simple construction which is capable of being readily applied to a brake lever and brake beam strut and which is adjustable for retaining the brake lever in a proper position irrespective of the extent of wear of the lever and strut.

Other objects and advantages of the invention will hereinafter become more fully apparent from the following description of the drawings, which illustrate preferred embodiments thereof, and wherein:

Figure 1 is a plan view of a portion of a piece of railway rolling stock showing the wear compensator applied to a brake beam strut and a brake lever;

Figure 2 is a side elevational view, partly in section, looking from left to right of Figure 1;

Figure 3 is an enlarged sectional view taken substantially along a plane as indicated by the line 3—3 of Figure 1;

Figure 4 is a transverse sectional view taken substantially along a plane as indicated by the line 4—4 of Figure 3;

Figure 5 is a perspective view of the wear compensator shown in Figures 1 to 4;

Figure 6 is a fragmentary plan view similar to Figure 1 and showing a slightly modified form of the wear compensator;

Figure 7 is a cross sectional view taken substantially along a plane as indicated by the line 7—7 of Figure 6;

Figure 8 is a transverse sectional view taken substantially along a plane as indicated by the line 8—8 of Figure 7, and Figure 9 is an enlarged perspective view of a modified wear compensator shown in Figures 6, 7 and 8.

Referring more specifically to the drawings, 10 designates generally a portion of a railway car or other railroad rolling stock and which includes a pair of track engaging wheels 11 which are mounted on the ends of an axle 12. A brake gear frame 13 includes a brake beam strut 14 formed of corresponding laterally spaced arms 15 and 16 which combine to form a slot 17 therebetween. The brake beam strut 14 is canted so that the plane thereof is disposed substantially at an oblique angle to the horizontal.

A brake lever 18 extends through the slot 17 and is pivotally connected to the strut 14, intermediate of its ends, by a nut and bolt or other suitable fastening 19 which extends through the arms 15 and 16 of the strut 14. The lever 18 is thus pivotally mounted and supported by the strut 14 and in a plane substantially parallel thereto and is pivotally connected at its upper end to one end of a connecting rod 20 which projects therefrom over the axle 12. It will be readily apparent that when the strut 14 and lever 18 become worn that the upper end of the lever 18 will tend to swing downwardly, thereby causing the connecting rod 20 to come in contact with the axle 12 so that the reciprocating movement of the connecting rod 20 will result in wear thereon, which will soon cause the connecting rod to break. The parts previously described are all of conventional construction in railroad rolling stock and have been illustrated and briefly described to provide a better understanding of the construction and use of the wear compensator, designated generally 21 and which comprises the invention.

The wear compensator 21, as illustrated in Figures 1 to 5, includes a plate which is provided with a longitudinally disposed recess 22 which opens outwardly of one end thereof and which extends inwardly to beyond the intermediate portion of the plate to form corresponding, longitudinally disposed wings 23. The opposite end of the plate 21 is provided with longitudinally disposed ribs 24 which extend from the end thereof to a point beyond the inner end of the recess 22 and the inner ends of which are disposed between the side edges of the compensator 21 and the recess 22, as best seen in Figure 5. The ribs 24 are formed by crimping the plate forming the compensator 21 and taper from their outer to their inner ends to form wedges, as will hereinafter become apparent.

The compensator 21 is adapted to be interposed in the brake beam strut 14 between the lever 18 and the upper side or leg 16, the recess 22 being provided to accommodate the shank of the fastening 19, as clearly illustrated in Figures 3 and 4. The compensator 21 may be driven into the space between the lever 18 and the legs 16 to the extent permitted by the ribs 24 so that the lever 18 will be disposed flush against the underside of the compensator 21 and the inner side of the strut leg 15. The wings 23 are then bent back upon themselves in a clockwise direction, as seen in Figure 3, to position the free ends of the wings 23 over the outer side of the strut legs 16 to thereby prevent removal of the compensator 21. It will be readily apparent that the compensator 21 will function efficiently to prevent canting of the lever 18 so that the rod 20 will come in contact with the axle 12 and will thereby function to prevent this abnormal wear and resulting breakage of the connecting rod.

A slightly modified form of compensator, designated generally 25, is illustrated in Figures 6 to 9. The compensator 25 is provided with a recess 26 forming wings 27 and ribs 28. The parts 26, 27 and 28 correspond to the recess 22, wings 23 and ribs 24 of the compensator 21. A modification of the compensator 25 is in the provision of a bar 29 which projects from the back edge thereof, between the ribs 28. The compensator 25 is applied in the same manner as the compensator 21 after which the bar 29 is bent upwardly and back upon itself into the position as illustrated in the drawings, so that a portion of the bar 29 will bear on the headed end of the fastening 19 to effectively prevent detachment of the bolt of the fastening in case the nut thereof becomes disengaged. Obviously, if desired, the bar 29 can be bent into its position, as illustrated in the drawings, and while thus disposed, the compensator 25 can be applied to position the bar in engagement with the fastening head. The wings 27 are adapted to be bent back upon themselves in the same manner and for the same purpose as the wings 23 and the ribs 28 function in the same manner as the ribs 24.

Various modifications and changes are contemplated and may obviously be resorted to without departing from the spirit and scope of the invention as hereinafter defined by the appended claims.

I claim:

1. In combination with a brake beam strut of an item of railway rolling stock and a brake beam lever which is pivotally mounted intermediately of its ends therein, a wear compensator comprising an elongated plate provided with a longitudinally disposed recess opening outwardly of one end thereof and forming wings at said end and on either side of the recess, said plate being disposed in the brake beam strut between one side thereof and the brake beam lever and with the recess of said plate accommodating the pivot of the lever, said wings being bent back upon themselves to engage over said sides of the brake beam strut for retaining the wear compensator in applied position, said plate being provided with longitudinally disposed ribs extending inwardly from the opposite end thereof, and said ribs being tapered from their outer to their inner ends and being adapted to engage said aforementioned side of the brake beam strut.

2. In combination with a brake beam strut of an item of railway rolling stock and a brake beam lever which is pivotally mounted intermediately of its ends therein, a wear compensator comprising an elongated plate provided with a longitudinally disposed recess opening outwardly of one end thereof and forming wings at said end and on either side of the recess, said plate being disposed in the brake beam strut between one side thereof and the brake beam lever and with the recess of said plate accommodating the pivot of the lever, said wings being bent back upon themselves to engage over said sides of the brake beam strut for retaining the wear compensator in applied position, and a bar projecting from the opposite end of said plate and having a turned back portion disposed over the plate and adapted to engage the headed end of the lever pivot, when the wear compensator is in an applied position, for retaining the pivot in engagement with the brake beam strut and lever.

3. In combination with a brake beam strut of an item of railway rolling stock and a brake beam lever which is pivotally mounted intermediately of its ends therein, a wear compensator comprising an elongated plate provided with a longitudinally disposed recess opening outwardly of one end thereof and forming wings at said end and on either side of the recess, said plate being disposed in the brake beam strut between one side thereof and the brake beam lever and with the recess of said plate accommodating the pivot of the lever, said wings being bent back upon themselves to engage over said sides of the brake beam strut for retaining the wear compensator in applied position, said plate being provided with longitudinally disposed ribs extending inwardly from the opposite end thereof, said ribs being tapered from their outer to their inner ends and being adapted to engage said aforementioned side of the brake beam strut, and a bar projecting from the opposite end of said plate and having a turned back portion disposed over the plate and adapted to engage the headed end of the lever pivot, when the wear compensator is in an applied position, for retaining the pivot in engagement with the brake beam strut and lever.

4. In combination with a brake beam strut of an item of railway rolling stock and a brake beam lever which is pivotally mounted intermediate of its ends therein, a wear compensator comprising an elongated plate having a bifurcated end, said plate being interposed between the lever and one leg of the strut and with the furcations of said bifurcated end straddling the lever pivot, said furcations being bent back upon themselves to engage over said leg of the strut to retain the plate in an applied position, said plate being provided with longitudinally disposed upstanding ribs extending inwardly from the opposite end thereof and adapted to bear against said leg of the strut, and said ribs being tapered from their outer to their inner ends.

HARRY D. BROWN.

REFERENCES CITED

The following references are of record in the file of this patent:

UNITED STATES PATENTS

| Number | Name | Date |
|---|---|---|
| 1,556,108 | Harbert | Oct. 6, 1925 |